US008376841B2

(12) United States Patent
Boesen et al.

(10) Patent No.: US 8,376,841 B2
(45) Date of Patent: Feb. 19, 2013

(54) PROGRESSIVE JACKPOT INCREMENTING SYSTEM

(75) Inventors: John Boesen, Rosebery (AU); Natalie Bryant, Rosebery (AU)

(73) Assignee: Aristocrat Technologies Australia Pty Ltd (AU)

( * ) Notice: Subject to any disclaimer, the term of this patent is extended or adjusted under 35 U.S.C. 154(b) by 0 days.

(21) Appl. No.: 11/843,349

(22) Filed: Aug. 22, 2007

(65) Prior Publication Data

US 2008/0032782 A1 Feb. 7, 2008

Related U.S. Application Data

(63) Continuation of application No. 10/110,289, filed as application No. PCT/AU01/00861 on Jul. 16, 2001, now abandoned.

(30) Foreign Application Priority Data

Jul. 20, 2000 (AU) ........................................ PQ8902

(51) Int. Cl.
*A63F 13/00* (2006.01)

(52) U.S. Cl. ............................... 463/27; 463/26; 463/42

(58) Field of Classification Search .............. 463/16–20, 463/25–29, 40–42; 273/138.1, 138.2, 139, 273/143 R, 120 A, 121 R, 121 A, 121 B, 273/123 R, 124 R, 124 A
See application file for complete search history.

(56) References Cited

U.S. PATENT DOCUMENTS

| | | | | |
|---|---|---|---|---|
| 4,837,728 | A * | 6/1989 | Barrie et al. | 463/27 |
| 5,123,649 | A | 6/1992 | Tiberio | |
| 5,280,909 | A * | 1/1994 | Tracy | 463/27 |
| 5,697,611 | A | 12/1997 | Kelly et al. | |
| 5,836,819 | A | 11/1998 | Ugawa | |
| 5,851,148 | A | 12/1998 | Brune et al. | |
| 6,012,982 | A | 1/2000 | Piechowiak et al. | |
| 6,029,973 | A | 2/2000 | Takemoto | |
| 6,047,963 | A | 4/2000 | Pierce et al. | |
| 6,159,098 | A | 12/2000 | Slomiany et al. | |
| 6,203,009 | B1 | 3/2001 | Sines et al. | |
| 6,358,146 | B1 | 3/2002 | Adams | |

FOREIGN PATENT DOCUMENTS

| | | |
|---|---|---|
| EP | 0219305 A2 | 4/1987 |
| WO | 00/30727 | 6/2000 |

OTHER PUBLICATIONS

International Search Report corresponding to International Patent Application No. PCT/AU01/00861, mailed Aug. 22, 2001.

* cited by examiner

*Primary Examiner* — James S McClellan
(74) *Attorney, Agent, or Firm* — McAndrews, Held & Malloy, Ltd.

(57) ABSTRACT

A gaming system and a method of operating a bonus prize awarding system, the system comprising a plurality of electronic gaming console having a console cabinet 10 including a prize display 12, a coin entry slot 13, a pay out tray 14 and internally mounted game control processor circuits. A video game is provided for play on the console in which images of objects (balls) are dropped through a series of obstacles (pins) and eventually fill a number of containers. Prizes are paid according to either the number of balls which are in each container at the end of the ball drop and/or the manner in which the pins are hit, and bonus prizes are increased progressively upon the occurrence of predetermined game events within the game or external to the game.

8 Claims, 15 Drawing Sheets

PROGRESSIVE JACKPOT INCREMENTING SYSTEM

CROSS REFERENCE TO RELATED APPLICATIONS

This is a continuation of U.S. application Ser. No. 10/110,289, filed Mar. 20, 2002, as the National Stage Entry of PCT/AU01/00861, filed Jul. 16, 2001 and claims priority from Australian Patent Application PQ8902, filed Jul. 20, 2000. The foregoing applications are herein incorporated by reference in their entirety.

The present invention relates to gaming machines or consoles of the type generally referred to as slot machines, and in particular the invention provides a new method of awarding jackpots on such a machine.

Players who regularly play gaming machines quickly tire of particular games and therefore it is necessary for manufacturers of these machines to come up with innovative games or game features and bonus awards that add interest to the games provided on such machines in order to keep the players amused and therefore willing to continue playing the game.

DESCRIPTION OF THE PRIOR ART

Gaming or poker machines have been well known in a number of countries for many years and have more recently gained increased popularity in those jurisdictions in which they were already known as well as becoming more widely accepted in new jurisdictions. As a result quite substantial amounts of money are wagered on these machines worldwide. There is a growing tendency for State governments to legalise the use of gaming machines by licensing operators, with resulting revenue gains through licence fees and taxation of monies invested. The licensed operation of gaming machines is the subject of State legislation and regulation. This regulation almost always dictates a minimum percentage pay out for a gaming machine. For example, a minimum of 85% of monies invested must be returned as winnings, and manufacturers of gaming machines therefore must design their machines around these regulatory controls.

With the growth that has occurred in the gaming machine market there is intense competition between manufacturers to supply the various existing and new venues. When selecting a supplier of gaming machines, the operator of a venue will often pay close attention to the popularity of various games with their patrons.

Therefore, gaming machine manufacturers are keen to devise games which are popular with players, as a mechanism for improving sales.

In particular, manufacturers regularly devise new games and features which have not previously been seen on slot machines in order to stimulate renewal of player interest.

Pachinko is a game popular in Japan in which an 11 mm diameter steel ball is fired into a labyrinth of pins or nails projecting from a back panel and awards are gained if the balls can be caused to come to rest in certain locations. Typically, when a ball is caused to come to rest in a designated prize winning position, the player is rewarded with additional balls, the number of balls awarded to the player being dependant on the particular location that the ball is brought to rest. The player purchases balls from the operator before commencing play, or when he runs out and after stopping play, a player may exchange balls for non-monetary prizes.

In this specification the term Gaming console will be used to refer to a gaming machine of the type having a video display screen on which a game is displayed with player inputs being either by physical buttons joysticks etc or by pseudo buttons, etc, provided as touch sensitive areas on the display, or a mixture of each. Typical games that have previously been provided on such consoles include video simulations of spinning reels or video card games among others.

SUMMARY OF THE INVENTION

According to a first aspect, the present invention provides a method of awarding a feature or bonus in a game played on an electronic gaming console comprising credit means, reward means, game control means, display means, and player input controls, the control means being responsive to the credit means and the player input controls to play a game which is displayed on the display means and if a winning event occurs, a player reward is awarded by the reward means, wherein the game played on the gaming console provides a video display of a labyrinth of pins and the player input controls allow the player to initiate the motion of ball images on the display, player rewards being awarded when the ball images come to rest in predetermined prize winning locations, the game being characterized in that a variable value bonus prize is awarded when a predetermined triggering event occurs, the value of the bonus prize available for a future instance of the bonus prize award being altered in response to the occurrence of predetermined events in respect of a current instance of the game.

In regard to this aspect of the invention, the predetermined event causing the value of the bonus prize award to be incremented, may be an event independent of the game itself. Thus, the predetermined event may be related to the placing of a bet in respect of the game, ie the value of the bonus prize award may be responsive to turnover on the gaming console.

According to a second aspect of the invention, there is provided a gaming system which includes a plurality of electronic gaming machines, each gaming machine having a display means and a game control means arranged to control images displayed on the display means, the game control means of each machine being arranged to play a game wherein one or more random events are caused to be displayed on the display means and, if a predefined winning event occurs, the machine awards a prize, the gaming system being characterized in that it includes a progressive meter to which each of the gaming machines is linked such that the progressive meter is altered by the occurrence of predetermined prize altering events during the playing of a game on any one of the gaming machines.

Thus, in the case of a linked jackpot, participating or contributing games could be spinning reel games, card games or ball games. In regard to the second aspect of the invention, it is the occurrence of the event during the playing of the game which increases the value of the jackpot rather than having the value of the jackpot linked to turnover on the gaming machines of the gaming system.

According to a third aspect of the invention, there is provided a method of awarding a feature or bonus in a game for an electronic gaming console comprising credit means, reward means, game control means, display means and player input controls, the control means being responsive to the credit means and the player input controls to play a game which is displayed on the display means and, if a winning event occurs, a player reward is awarded by the reward means, wherein the game played on a gaming console provides a video display of a labyrinth of pins and the player input controls allow the player to initiate the motion of ball images on the display, player rewards being awarded when the ball images come to rest in predetermined prize winning locations, the game being characterized in that, a variable value bonus prize is awarded when a predetermined triggering event occurs, and when a predetermined prize altering event occurs, a level of bonus being played for in a current instance of the game is altered.

In one embodiment of the invention, the events that increment the bonus prize for future bonus prize awards are otherwise non-winning events, however, in other embodiments these events may also award a prize immediately.

Embodiments of the invention may include a pre-determined triggering event occurring in the main game or a random event such as hyperlink. The jackpot awarding means may be independent of the jackpot incrementing means. Instead, the jackpot awarding means may be related to the jackpot incrementing means such as, for example, by being a subset of events that constitute the jackpot incrementing means.

In one embodiment, the game is characterised in that values are assigned to one or more of the pins, such that the bonus for future instances of the game is increased by the respective value if a pin is struck by a ball and the number of pins having bonus increasing values assigned to them is related to the number of credits bet.

In another embodiment, the game is characterised in that a plurality of targets (which may include cups, buckets or pins are provided and values are assigned to the targets such that if a ball comes to rest in or on the target, the bonus for future instances of the game is increased by the respective value and the number of targets provided in a game is related to the number of credits bet.

In other embodiments, holes are provided in the pin pattern, such that balls may fall into the holes during a game and the occurrence of a ball falling down one of the holes will increment the bonus prize for future instances of the game. After dropping down a hole a ball may re-appear in the game to continue the ball drop, or to represent the incrementing bonus prize. Alternatively, the balls may simply disappear.

Embodiments of the invention may include any one or more of the following features:—

- balls of different colours are provided and when a ball is dropped, the bonus is increased by a value which is a function of ball colour
- the bonus is increased by a predetermined amount when a ball of a predetermined colour is dropped
- the bonus is increased when the ball of predetermined colour interacts with another game feature
- the bonus is incremented when the ball of predetermined colour falls into a hole
- at least one ball changes colour as it drops through the labyrinth
- at least one ball changes the colour of any pins that it hits, as it drops through the labyrinth, to its own colour and the bonus is increased by a predetermined value when a predetermined number of pins change colour, or change to a predetermined colour
- at least one ball, if it drops into a container, changes the colour of all other balls in that same container at the end of the game and the bonus is increased by a predetermined value
- balls of different sizes are provided and the dropping of a ball of a predetermined size will increase the bonus by a predetermined value
- a bonus meter is increased by a value according to the size of a ball dropped
- larger balls are provided which will not fit between some pins or into some holes or containers such that the large balls may block holes or containers that they come to rest against or may knock out pins that they hit and whereby only small balls will increase the bonus
- balls landing in outside buckets each serve to increase the bonus by a predetermined value
- the position from which the balls are dropped is variable from game to game and within a game
- the position from which the ball is dropped is selected at random by the control means
- the position from which the ball is dropped is selected by the player using the player controls
- the game permits a varying the number of active balls to be purchased and dropped, while maintaining a constant total number of balls being dropped from game to game, the total number of balls being independent of the number of active balls dropped
- the balls not purchased by the player are available to increase the bonus meter
- each ball has a plurality of possible associated functions or characteristics one of which causes the bonus to increase
- the functions or characteristics associated with the balls may be varied from game to game
- the functions or characteristics associated with the balls may be selected by the player
- different shaped balls are provided such that the shape of the balls are matched to holes and only balls with matching shapes can fall into a respective hole
- certain shaped holes will serve to increment the progressive when the appropriately-shaped ball drops into them
- the pins that the ball hits change colour or are lit to mark the path of the ball
- the lit pins indicate the amount by which the bonus will be increased
- the lit pins may be retained from one game to the next
- The lit pins increment the bonus when hit, while unlit pins do not
- holes are provided and when balls drop into the holes the bonus is increased
- the balls that drop into holes are transformed to another location, and the transformed ball is channelled into a container
- the container is a jackpot bucket that is representative of the amount by which the bonus has been increased
- the transformed ball appears coming out of another hole
- the transformed ball re-appears in other section of the screen
- some balls are provided with indicia where the indicia are numbers and, the bonus is increased by the amount dictated by the number on the numbered balls when the balls perform a bonus increasing function
- at least one hole is provided which disappears or closes up as soon as a ball drops into it
- at least one ball is provided which will enable and/or disable the increasing of the bonus
- at least one ball is provided which knocks down pins, creating pin holes where the pins were located and can fall down the pin holes to increase the bonus
- at least one ball is a larger sized ball relative to the remaining balls such that the larger ball is less likely to fall down holes
- the configuration of the labyrinth of pins is varied depending upon the current level of the bonus
- the number of rows of pins is variable from game to game, depending upon the level of the bonus
- one or more of the pins are bonus pins, such that the bonus is increased if the bonus pin is struck by a ball
- the number of bonus pins is related to the number of credits bet selection of the amount by which the bonus will be increased is determined according to how the pins are struck by each ball dropped the increasing of the level of bonus being played for depends upon how the pins are struck at least one pin is associated with a bonus whereby the bonus is increased if the pin is hit by a plurality of balls the number of balls required to hit the pin for the bonus to increase may be varied from game to game the number of balls required to hit the pin for the bonus to be increased may be selected by the player the bonus is increased when a pattern of pins is hit, the pattern being selected as one of, a row, a diagonal, or a diamond shape pattern of pins can vary from game to game the level of bonus being played for, depends upon how the pins are struck at least one pin is provided which, on each occasion it is hit, becomes lit and changes the level of bonus being played for at least one pin is provided which, when hit by a ball will swallow or capture the ball and increases the bonus at least one pin is provided which will release balls when hit and simultaneously increases the bonus at least one pin is provided which, on each occasion it is hit, it becomes lit and increases the bonus at least one pin is provided which, on each occasion it is hit, it changes colour and increases the bonus when a certain colour is achieved at least one pin is provided which, on each occasion it is hit, changes colour and changes the level of bonus being played for, when a certain colour is achieved at least one pin is provided which, on each occasion it is hit, it records the number of hits and increases the bonus when a predetermined count is reached at least one pin is provided which, on each occasion it is hit, increments a counter and when a predetermined count is reached, the player is established as being eligible to win the bonus a plurality of pins is provided which each have different colours and when pins having a predetermined combination of colours are all lit, the bonus is increased at least one pin is provided which has a hole in it for the ball to pass, and the bonus is increased when a ball passes through the pin at least one pin is provided which has in it, for the ball to pass and the level of bonus being played for is increased if the ball passes through the pin a pattern of pins is provided which randomly flash during a ball drop sequence and the bonus is increased if a pin is struck by a ball while the pin is flashing at least one pin is provided which has a number on it representing an amount by which the bonus will be increased when the pin is hit by a ball at least one pin is provided which has a number on it representing a level of bonus that will be awarded when the pin is hit by a ball at least one pin is provided which is capable of being lit and has a number on it representing an amount by which the bonus is increased when the pin is hit while lit at least one pin is provided which is capable of being lit and has a number on it representing the level of bonus that will be awarded when the pin is hit while lit at least one group of pins is provided, such that when all pins in the group are hit the bonus is increased at least one group of pins is provided in which each of the pins is capable of being lit, such that when all pins in the group are hit while lit the bonus is increased at least one pin is provided which is sticky such that if a ball hits the pin, the ball will stick and stay on the pin, and for every game that the ball remains stuck the bonus is increased when the ball is stuck to the at least one sticky pin, another ball is required to hit the stuck ball in order to dislodge it at least one bonus pin is provided such that, if a predetermined number of bonus pins are hit, or a bonus pin is hit, a predetermined number of times, the bonus will be increased a ball hits the bonus pin, it will skip to another position on the screen at which a jackpot is awarded a number of holes are located amongst the pins such that when a ball passes over a hole, it causes the bonus to increase and the ball enters the hole to be removed from the game the number and/or position of holes amongst the pins may be varied from game to game the number and/or position of holes amongst the pins may be selected by the player a plurality of targets are provided such that if a ball comes to rest in or on the target, the bonus is increased the target is a surface of an object the target is one of the prize winning locations the prize winning locations are containers the number of containers provided is related to the number of credits bet the position of bonus increasing locations may be varied from game to game the position of bonus increasing locations may be selected by the player the amount by which the bonus is increased depends on how the bonus locations are struck at least one bonus increasing location requires more than one ball to come to rest in the location before the bonus will be increased the number of balls required to come to rest in the at least one bonus increasing location before a bonus will be increased may be varied from game to game the number of balls required to come to rest in the at least one prize winning location before a bonus will be increased may be selected by the player one or more containers are provided such that the bonus is increased if the container or containers are filled in a pre-determined way the bonus is increased if a predetermined number of balls are caught in a predetermined set of one or more containers the number of balls required to be caught and the composition of the set of containers may vary from game to game the number of balls required to be caught and the composition of the set of containers may vary depending upon the level of bonus being played for the number of balls required to be caught and the composition of the set of containers may be selected by the player at least one container is a bonus container which causes the bonus to increase when a ball enters the container, the container having a closable cover which prevents balls from increasing the bonus when it is closed, the lid being opened and closed by predetermined trigger conditions the number of containers having covers and the number of triggers which open and close them may vary from game to game the number of containers having covers and the numbers of triggers which open and close them may be selected by the player when an animated object is provided such that that when the animated object catches a ball it moves the ball to a jackpot location balls may be held and accumulated in at least one container over a number of games to increase the bonus the ability to accumulate balls over a number of games to increase the bonus may be selected by the player the level of bonus being played for is a function of the number of credits bet at least one container is a bonus increasing container which moves position as the balls drop to provide a moving target the accumulated bonus is increased by an amount related to the number of balls which are in each container at the end of the ball drop a plurality of ball types are provided and the level of bonus being played for is determined according to the type of balls dropped the balls are marked with indicia and the amount by which a progressive will increment is determined according to the indicia on the balls which are in any container the indicia are numbers the numbers represent the amount by which the bonus will increase the numbers represent an amount by which the bonus level associated with the container is increased changing the credit bet by a player changes the size of the units by which the bonus will be increased the larger the credit bet by a player the larger the unit increase applied to the bonus the unit size increase varies linearly with credits bet a plurality of ball types are provided and the level by which a bonus will increase is determined according to the type of balls dropped the game has a number of bonus zones each offering a different level of jackpot to be played for the number and locations of the bonus zones may be varied from game to game the number and locations of the bonus zones may be selected by the player the number and locations of the bonus zones is selected by the size of the bet wagered by the player on the particular game when a bonus is awarded the bonus level being played for changes the game has a number of bonus zones, each offering a different amount by which the progressive will be increased an additional game is provided as a feature game associated with the base game, the feature game being an independent game, a predetermined trigger condition or award causing the feature game to run, and if a winning condition is achieved in the feature game, the feature game revealing a bonus condition the bonus condition is an award of a prize the bonus condition is a win multiplier which multiplies a prize already won the bonus condition is a number of free games the bonus condition is the awarding of one or more extra balls to drop in the base game the bonus condition causes a change in the game structure the trigger condition to run the feature game is achieved by the collection of one or more balls in a predetermined container the bonus condition is the increasing of the bonus available for future bonus awards the structure of the game is player selectable when a bonus is awarded the prizes associated with a particular container become larger a slot reel is activated by a ball or triggering event to provide a multiplier, or bonus trigger determined by the stopping position of the reel a chocolate wheel is activated by a ball or other means to provide a multiplier, bonus or trigger determined by the stopping position of the wheel a spinning reel game played above the pins such that when a winning combination occurs on the reels, coins come out from below the reels and drop into the pins such that the base game determines the prize a feature game element is used to determine the base game structure the prize values, position of holes, number of pins, and pin layout are determined by the feature game containers have multipliers associated with them and when a win occurs on a feature game, a ball is dropped through the pins to determine how much the win will be multiplied by.

BRIEF DESCRIPTION OF THE DRAWINGS

Embodiments of the present invention will now be described by way of example with reference to the accompanying drawings in which.

DETAILED DESCRIPTION OF THE PREFERRED EMBODIMENTS

In the following detailed description, the methodology of the embodiments will be described and it is to be understood that it is within the capabilities of the non-inventive worker in the art to introduce the methodology on any standard microprocessor based gaming console by means of appropriate programming.

Figure 1:
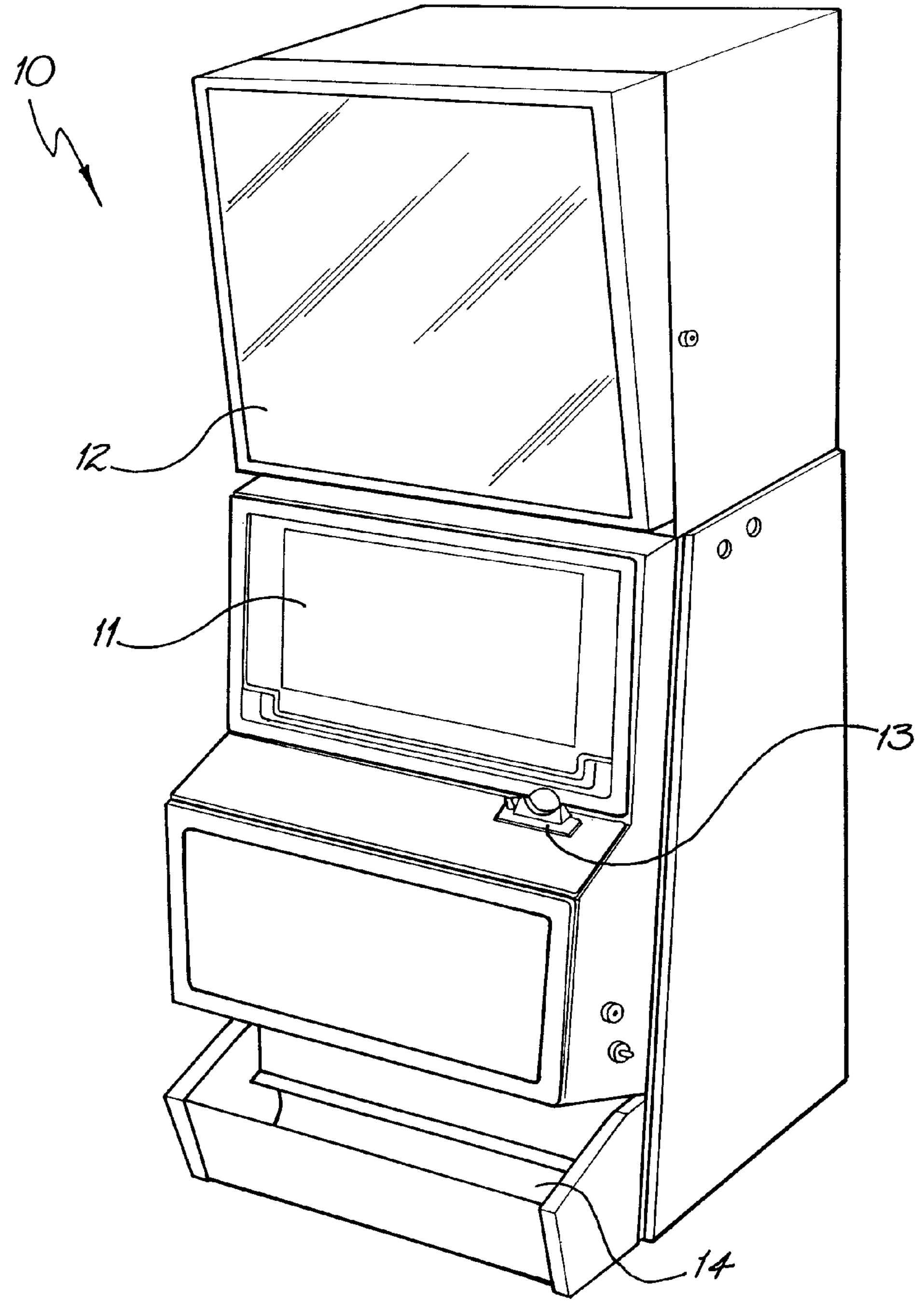
FIG. 1 illustrates a touch screen gaming console incorporating the present invention.

Referring to FIG. 1, the illustrated embodiment of the invention is housed in a conventional gaming console cabinet

Figure 2:
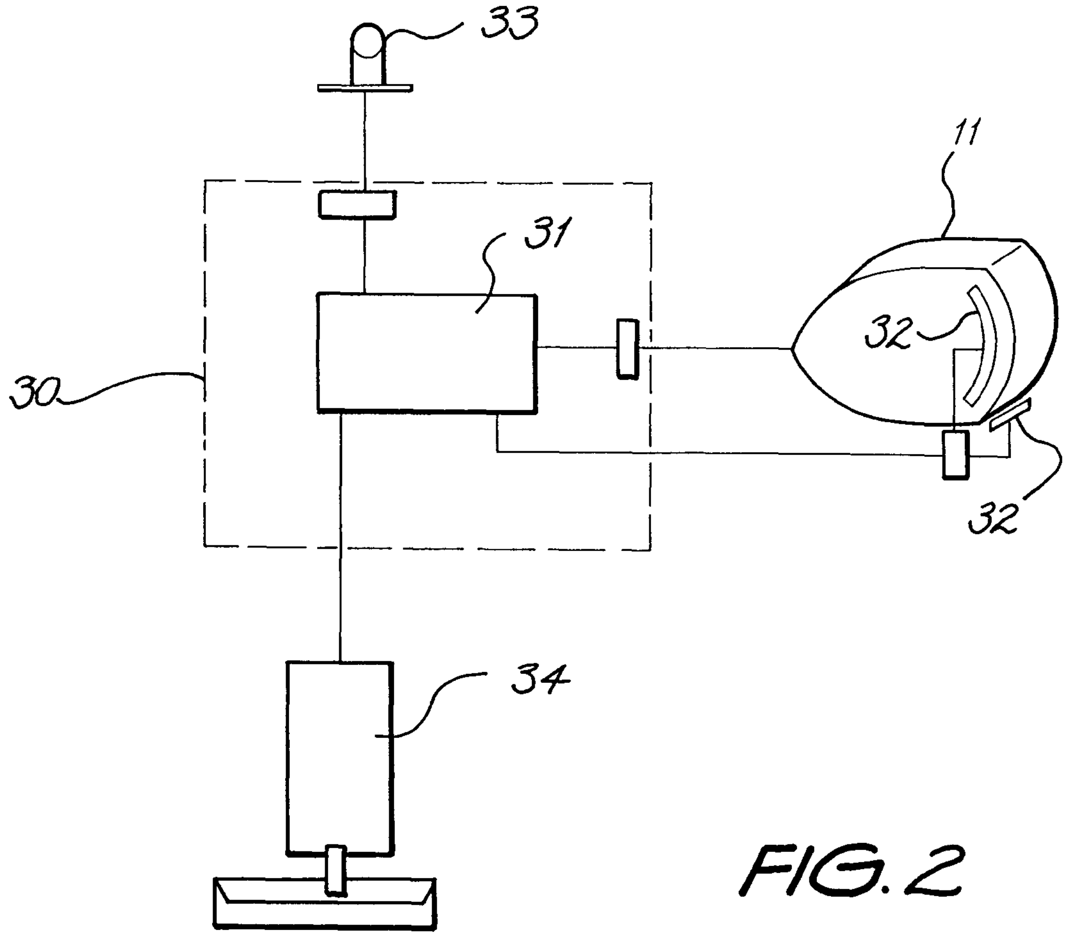
FIG. 2 is a schematic diagram of a gaming console control circuit.

10 including a prize display 12, a coin entry slot 13, a pay out tray 14 and internally mounted game control processor circuits (refer to FIG. 2).

The program to implement the game of the present invention runs on a standard gaming console control processor 31 as illustrated schematically in FIG. 2. This processor forms part of a controller 30 which drives the display screen 11 and receives input signals from input controls such as buttons or touch sensitive areas on a video display. In the illustrated embodiment, the controller receives touch input signals from touch sensors 32 as well as receiving coin input pulses from a coin chute mechanism 33 and sends signals to drive a coin pay out mechanism 34.

This is a new type of video game which involves balls (objects) being dropped through a series of pins (obstacles) and eventually filling a number of containers.

It is similar in some respects to games known as Pachinko, which are pin and ball games popular in Japan, however, this video embodiment includes features not evident in prior art slot machines. Examples of the display layout of games according to the present invention are illustrated in FIGS. 3 & 4.

Figure 3:
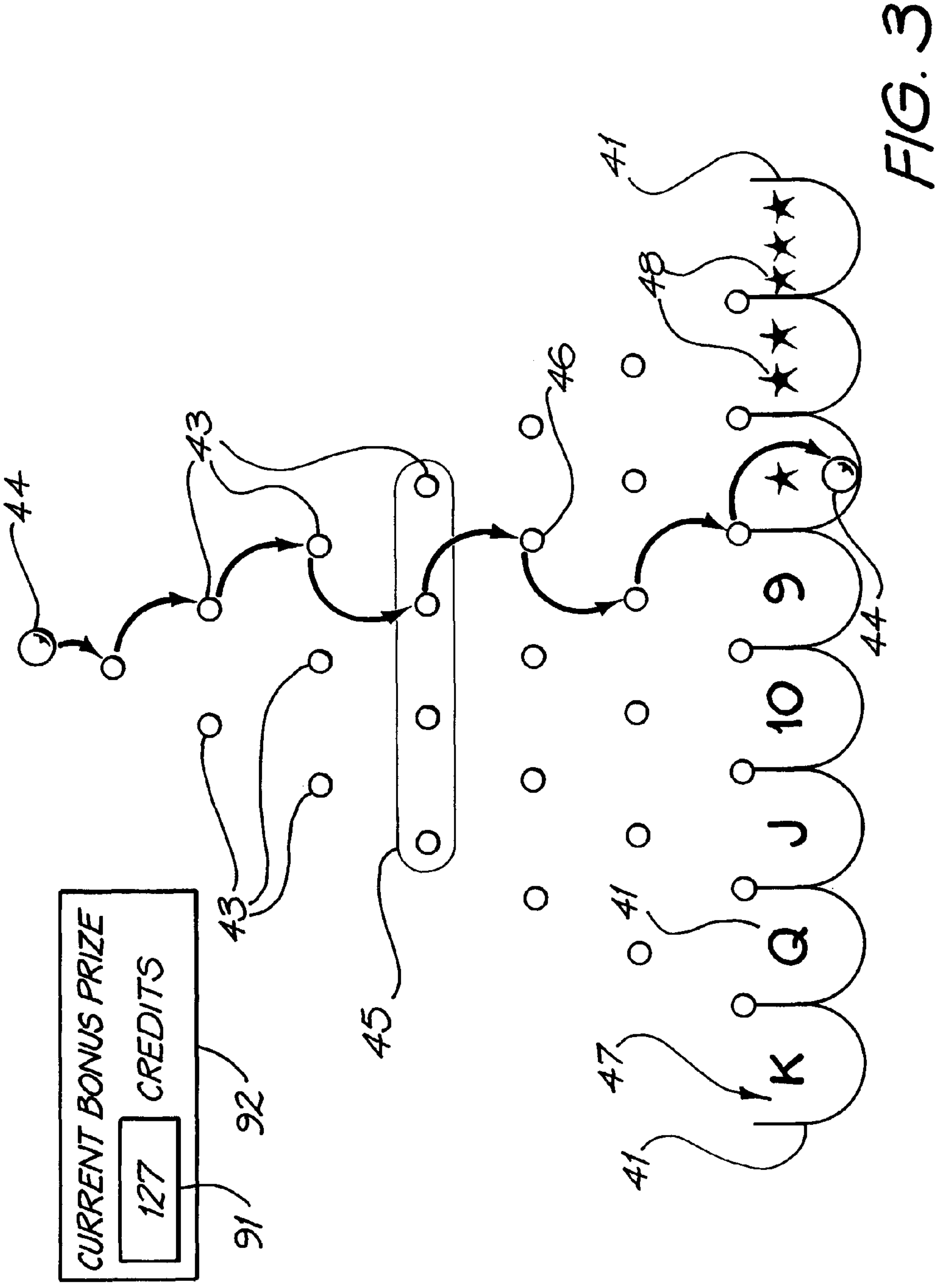
FIG. 3 is a diagram of a game screen with game features indicated.
Figure 4:
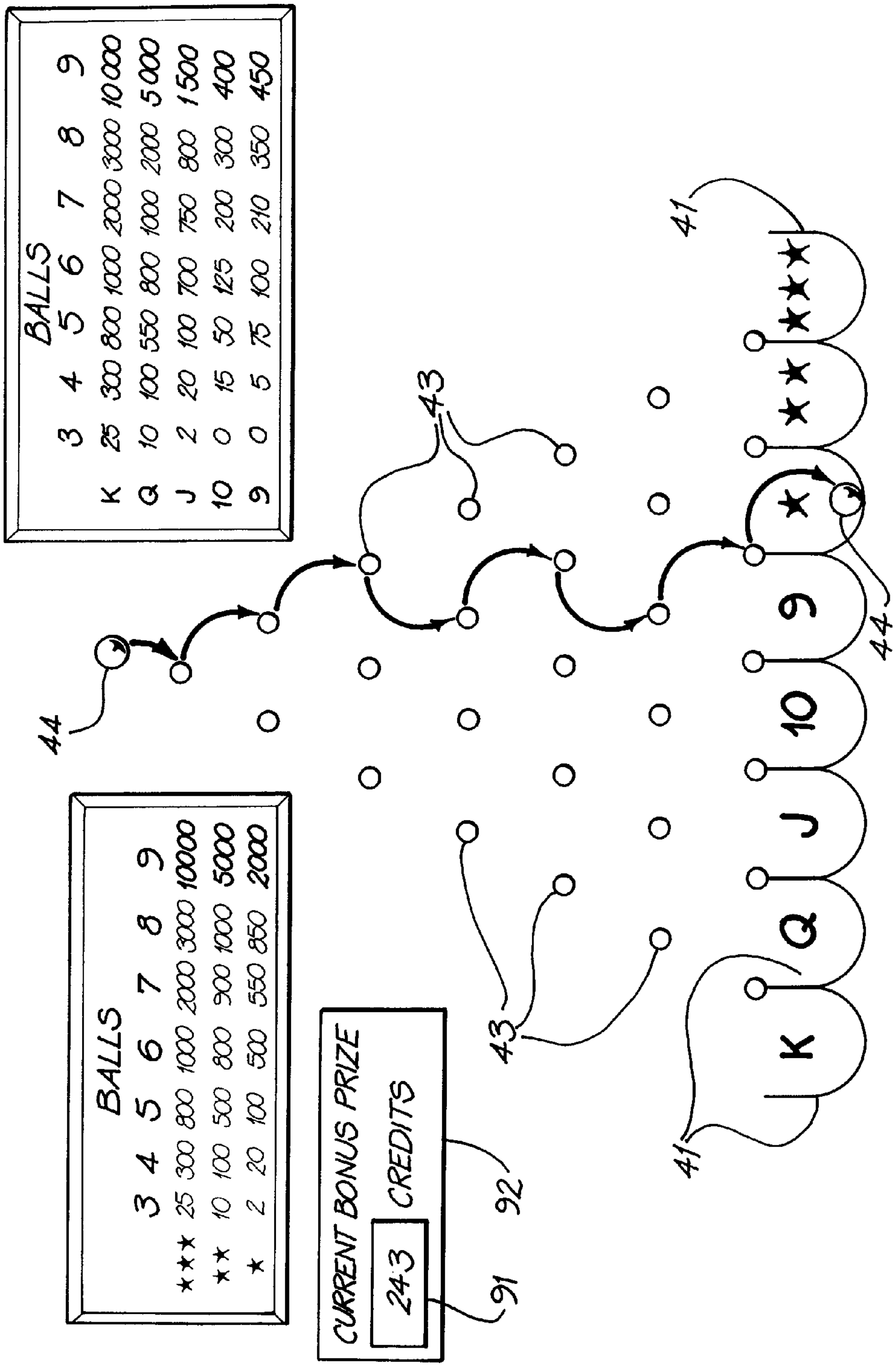
FIG. 4 is a diagram of a game screen showing prizes awarded for various numbers of balls in each of a plurality of buckets.

In FIG. 3, a game display is illustrated showing a plurality of possible game features in combination. The game includes as feature prizes:

a) free games
b) win multipliers
c) extra balls
d) incrementing jackpot prizes.

In this embodiment and all of the embodiments described hereinafter, reference to the awarding of a feature prize may include any one of, or a combination of any or all of, the feature prizes a-d referred to in the preceding paragraph. In particular, in every embodiment, the game may award a feature reward which is the incrementing of a bonus prize available for future games.

As the balls 44 fall through the pins 43 and are collected in buckets 41, if each of the pins in the row 45 is hit (ie., by a different ball in this game, but in other games possibly by the same ball where rebounding and/or flippers are provided), a feature prize is awarded. A second feature is provided if all balls hit a particular pin 46. A third feature is provided if all balls fall into a single bucket 47. A fourth feature 48 is awarded if at least one ball falls into each bucket 41. In the preferred embodiment, at least one of these features will increment the bonus prize value 91 indicated in a current bonus prize display 92.

Referring to FIG. 4, a similar game to that of FIG. 3 is illustrated with pay tables shown for different numbers of balls in each bucket.

Figure 5:
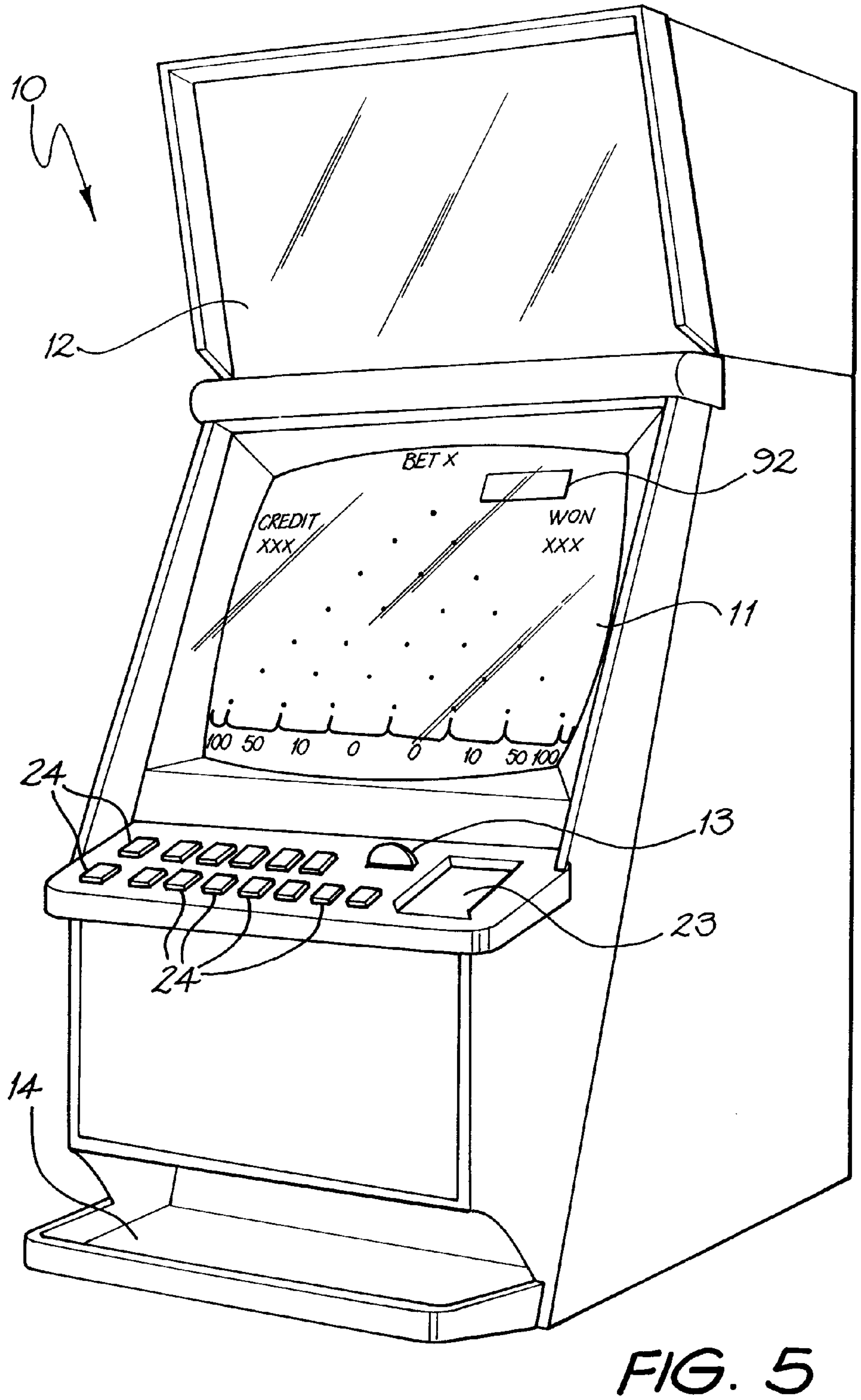
FIG. 5 illustrates a gaming console with button switch controls, incorporating a simple embodiment of the present invention.

Referring to FIG. 5, an example of a further simple embodiment of the invention is illustrated showing the entire console 10 with a simple game layout on the screen 11.

Again, the console includes a display panel 12, which has rules of the game and/or prize winning events illustrated for player information, a coin slot 13, video display screen 11 to display the game and a coin tray 14. As well, this embodiment has a bill acceptor 23 and push buttons 24 to control the game.

Figure 6:
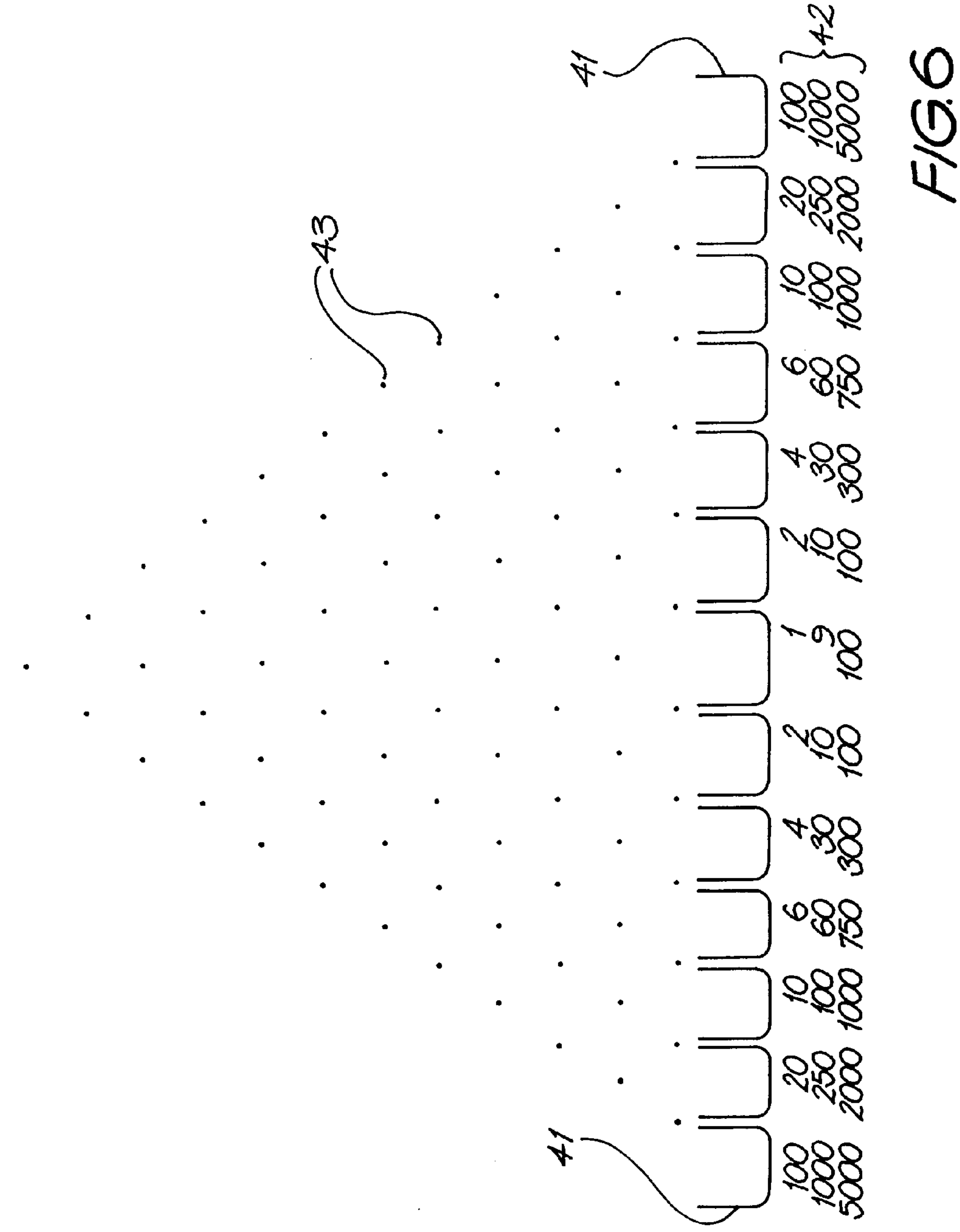
FIG. 6 illustrates a basic game screen layout without features.

FIG. 6 illustrates a basic game screen layout without additional game features. It should be noted that the different prize rows 42 under the buckets could be awarded for different numbers of balls, different types of balls (eg. shape, colour) or different ball combinations landing in the buckets; or even different ball drop patterns or similar.

Figure 7:
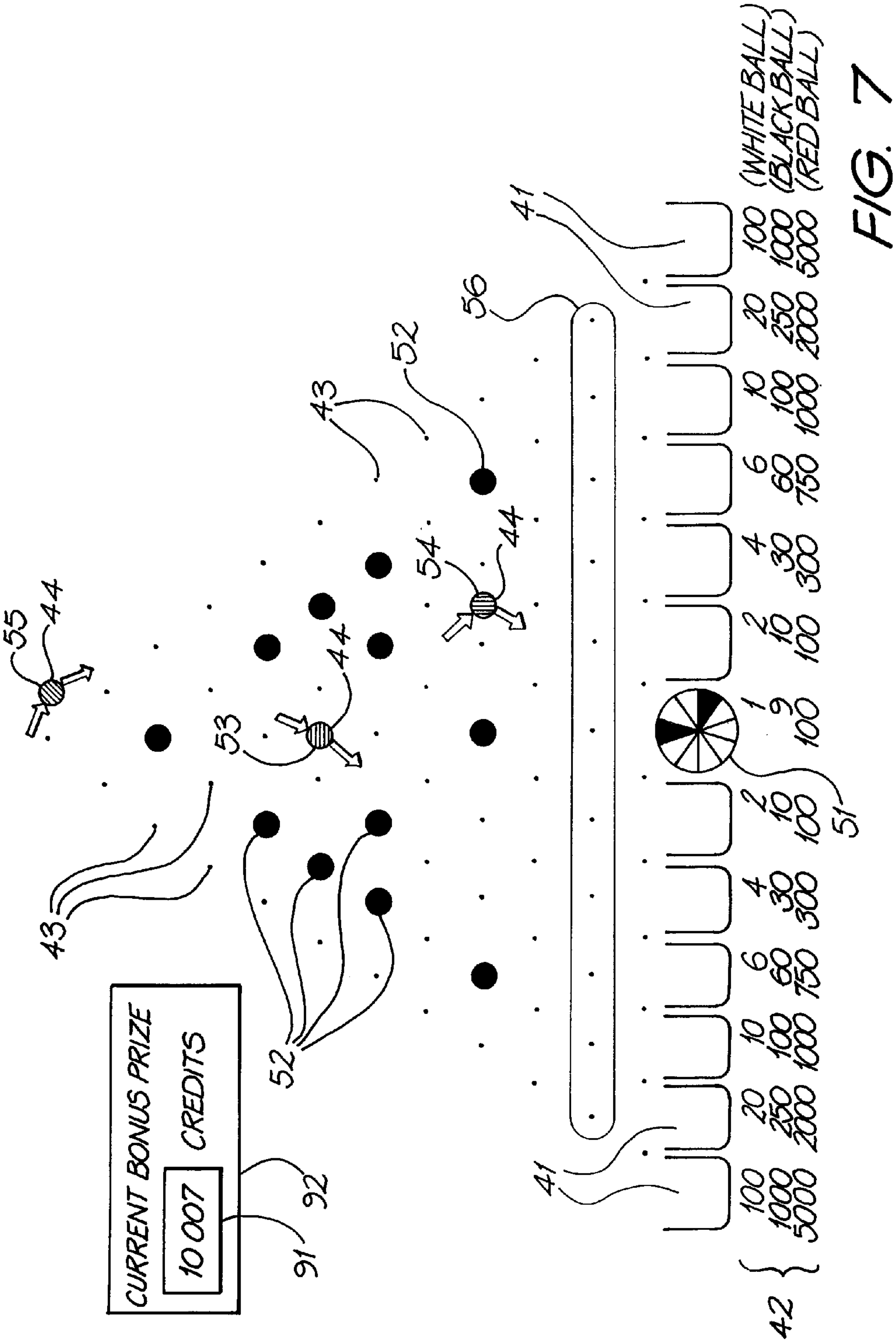
FIG. 7 illustrates a game screen layout with a set of preferred features.

FIG. 7 illustrates a game screen layout with a set of preferred features. In this embodiment the number of balls 44 dropped is dependent upon the number of credits staked (for example 1 credit buys 10 balls). A series of holes 52 are located amongst the pins such that if a ball passes over that point it will disappear from the screen. Balls that manage to avoid all of the holes 52 will either drop into a bucket 41 or through the chocolate wheel 51 at the bottom of the display. The balls 44 are in 3 different colours (randomly selected) 53, 54, 55 and prizes are paid at the end of the ball drop according to the colour of any balls that made it to a bucket 41. In the case of the chocolate wheel 51, prizes are awarded for each ball that drops through the chocolate wheel, causing the chocolate wheel to spin. The prize paid for the chocolate wheel is dependent upon the position in which the wheel stops. A feature is also included where one of the rows 56 below the holes contains pins that become lit when they are hit. Each time one of these pins is hit, the bonus prize indicator 91 is incremented. If 3 or more pins become lit in one game then 10 free games are awarded during which all of the holes are replaced by pins (hence guaranteeing a prize for each ball).

A further feature may include the bonus indicator 91 being incremented when a ball disappears down a predetermined one of the holes 52. Some of the balls that disappear down one or other of the holes 52, may reappear at a different location to contrive their drop, alternatively, the balls may be simply removed from play.

Figure 8:
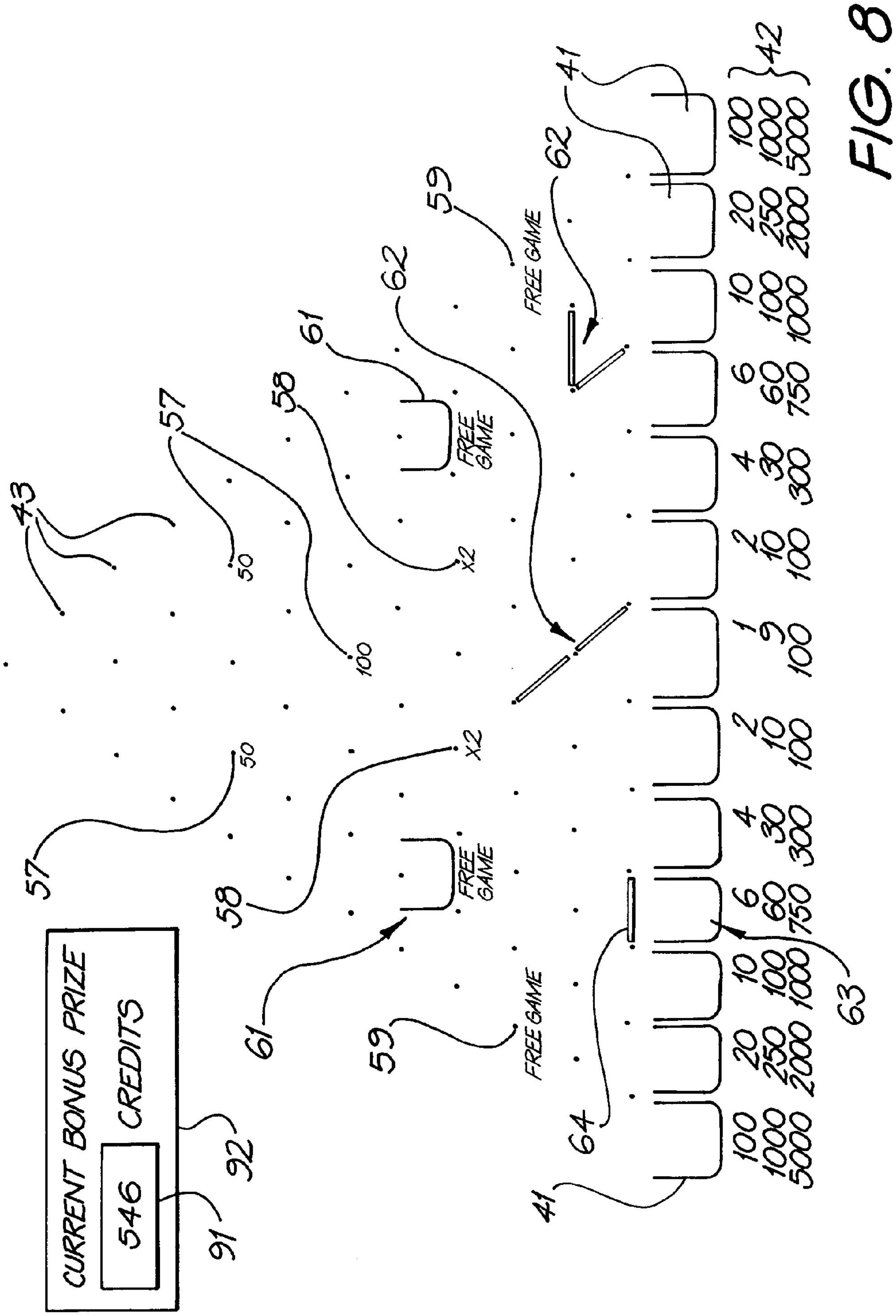
FIGS. 8-12 illustrate game screen layouts with further sets of preferred features.

FIG. 8 illustrates a game screen layout with a further set of preferred features. The features shown on this game layout are:

a) Fixed (or variable) prize awarded for any ball or a special ball (eg. colour, shape) or a pre-determined number of balls hitting a specific pin 57 (in the illustrated example, prizes are marked under the pins);
b) All wins from the game will be multiplied by a fixed (or variable) amount if any ball or a special ball (eg. colour, shape) or a pre-determined number of balls hit a specific pin 58;
c) One or more free games are awarded if any ball or a special ball (eg. colour, shape) or a pre-determined number of balls hit a specific pin 59;
d) Bonus or prize buckets 61 being placed in different positions;
e) Rods 62 joining pins to prevent balls from taking certain paths;
f) Buckets 63 may not always be open—a rod 64 may prevent the bucket 63 from being entered at certain times depending on triggers that occur in the game to open and close the bucket;
g) The bonus prize indicator 91 is incremented for each ball that hits a predetermined pin or stops in a predetermined bucket.

Figure 9:
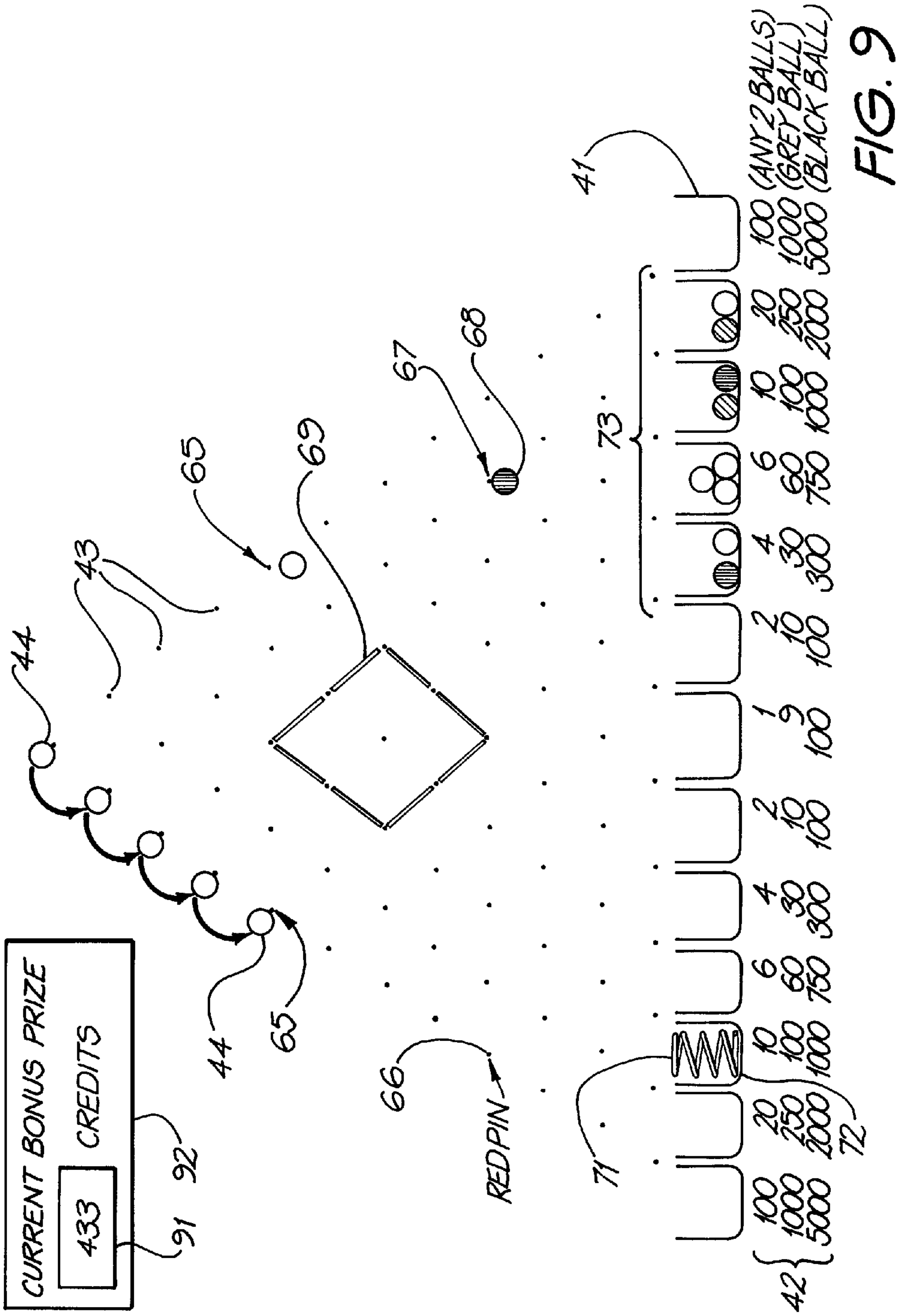
Figure 10:
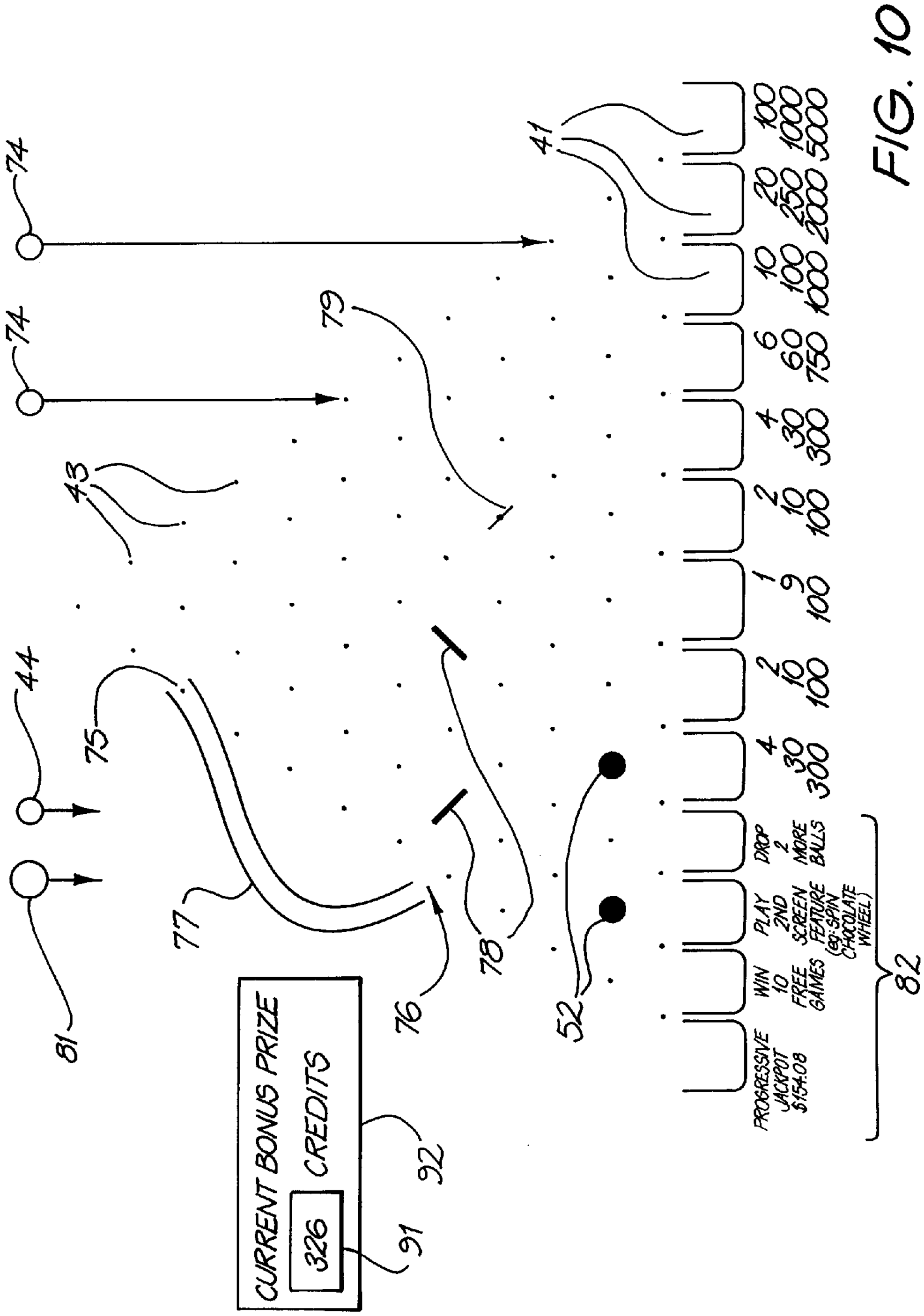

FIG. 9 illustrates a game screen layout with yet a further set of preferred features. The features shown on this game layout are:

a) Incrementing pins 65 where each time a ball or a specific type of ball hits the pin the indicator will increment. For example, a feature may be awarded when the incrementing pin reaches 5;
b) Different coloured pins 66 may give bonuses for being hit, or being hit by specific balls or a specified number of balls. The pins which are coloured may change from game to game;
c) Balls 68 may get stuck to certain pins 69 and/or when certain pins are hit a ball or balls may be released from the pin to drop in addition to the ball which hit the pin;
d) Certain features may involve complete sections 69 of the pin layout being blocked off giving an improved chance of balls landing in the outside buckets;

e) On certain occasions, a spring 71 may appear in a certain bucket(s) 72 such that if a ball lands in the bucket it will bounce back out again;

f) Different patterns of ball combinations 73 and colours in the buckets 41 may pay different amounts. In the diagram (assuming only the highest win will be paid), the first bucket will pay 300 for the black ball, the second will pay 6 for any 2 balls, the third will pay 1000 for the black ball and the fourth will pay 250 for the grey ball;

g) The bonus prize indicator 91 is incremented for each ball that hits a predetermined pin or stops in a predetermined bucket;

FIG. 10 illustrates a game screen layout with another set of preferred features. The features shown on this game layout are:

a) Dropping balls 74 from different positions will alter the chance of getting balls into the outside buckets. The drop position may be bought or random or a special feature;

b) A shortcut pin 75 may ensure that if it is hit the ball will be diverted to another position 76 on the screen via a path 77;

c) Flippers 78 may randomly or by way of player skill be used to flick balls in different directions when hit;

d) Diverter pins 79 can ensure that if they are hit the ball will fall in a fixed direction;

e) Different sized balls 81 could be used randomly or bought such that the bigger the ball the less likely it will fall into a hole;

f) A ball or a special ball (eg. colour, shape) or a pre-determined number of balls landing in certain buckets 82 may award special features instead of prizes;

g) The bonus prize indicator 91 is incremented for each ball that hits a predetermined pin or stops in a predetermined bucket.

Figure 11:
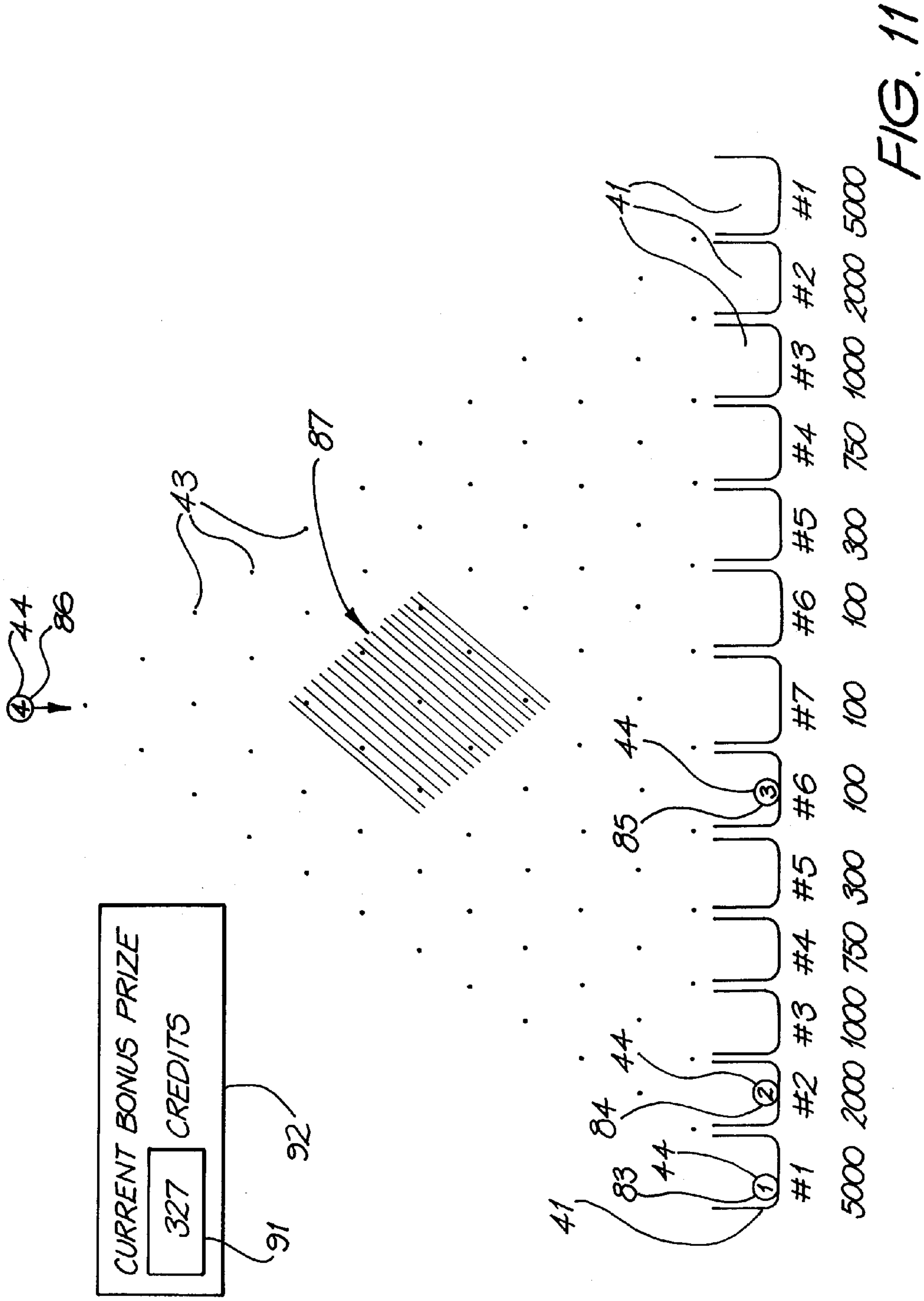

FIG. 11 illustrates a game screen layout with still another set of preferred features. The features shown on this game layout are:

a) Balls 83, 84, 85, 86 can be numbered for different features or win patterns. In this case, wins are paid if the correct numbered ball lands in the correct bucket;

b) Hence ball 83 (1) and fixed ball 84 (2) will pay 5000 and 2000 respectively, but ball 85 (3) will not pay a prize;

c) Prize zones 87 may be used. For example, a bonus may be given if all the pins within a fixed zone are hit (and hence become lit);

d) The bonus prize indicator 91 is incremented for each ball that hits a predetermined pin or stops in a predetermined bucket.

Figure 12:
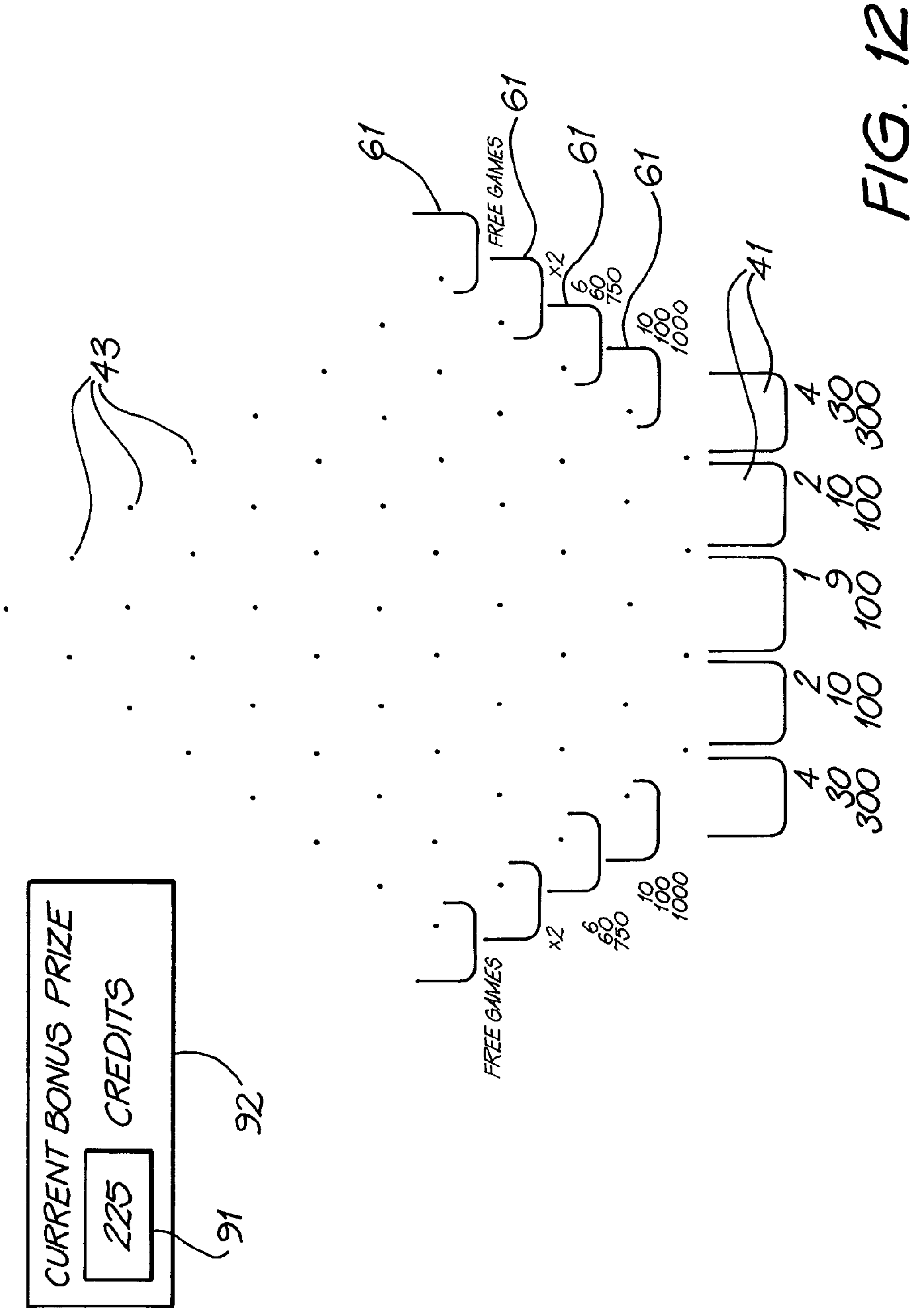

FIG. 12 illustrates a game screen layout with yet another set of preferred features. This diagram demonstrates how different shaped pin patterns can be used to vary the game.

Figure 13:
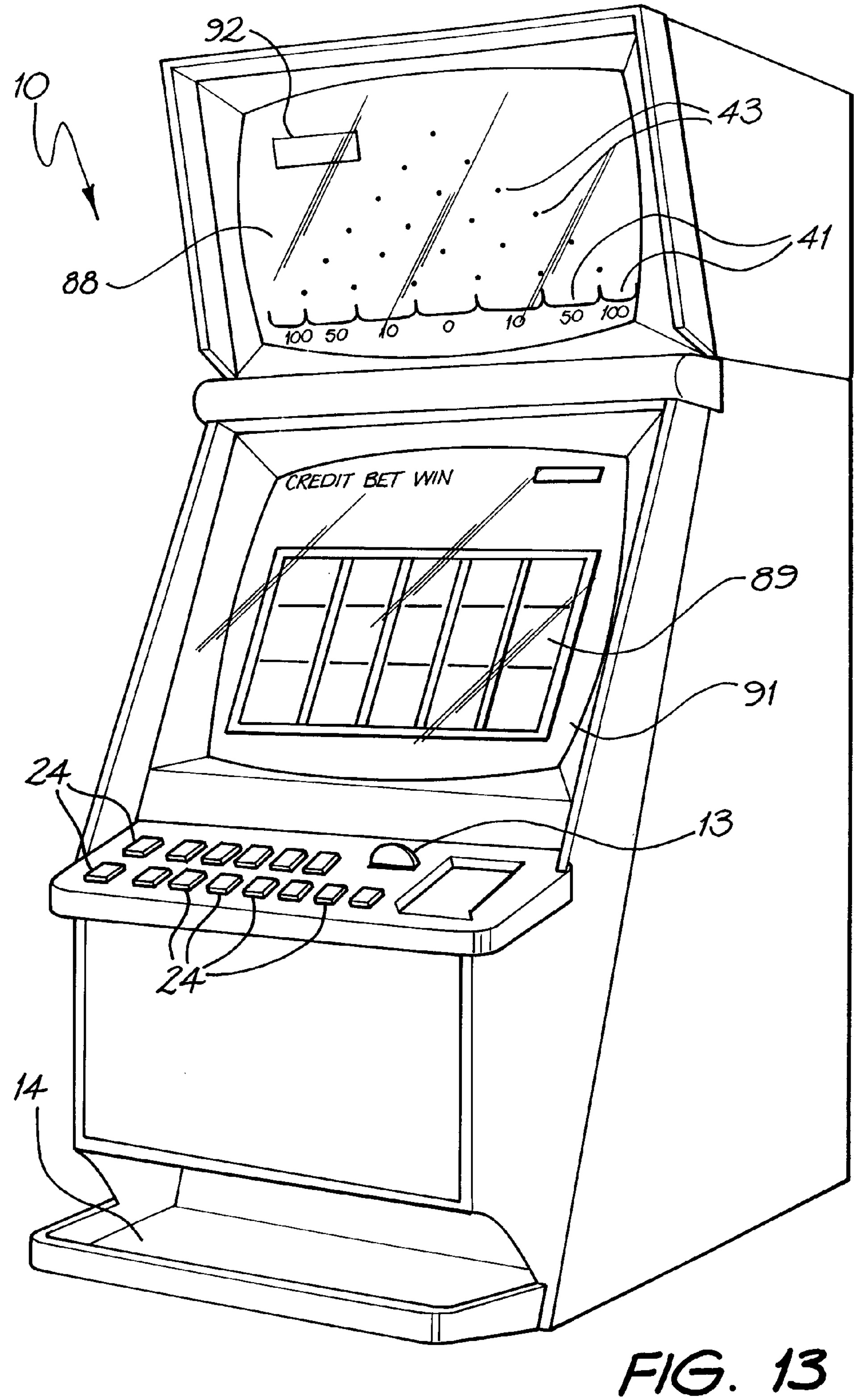
FIG. 13 illustrates a gaming console with button switch controls and two displays, incorporating a simple embodiment of the present invention in combination with another style of game (in this case a spinning reel game)

FIG. 13 illustrates a gaming console with button switch controls 24 and two displays, incorporating a simple embodiment of the present invention shown on a top screen 88 in combination with another style of game 89 (in this case a spinning reel game) shown on the lower screen 91.

Prizes are paid according to either the number of balls which are in each ball capturing location or container 41 at the end of the ball drop and/or the manner in which the pins are hit. Note that in the attached figures, the ball capturing locations are shown as cups, but may also be pairs of closely spaced pins (less than a ball diameter), or other suitable retaining device. Prizes may also be paid according to the type of balls dropped. For example, red balls may pay double the prize of the blue balls, or prizes may be paid according to indicia such as numbers on the balls which are in any container. When the indicia are numbers, the numbers may represent prize values or prize multipliers.

Figure 14:
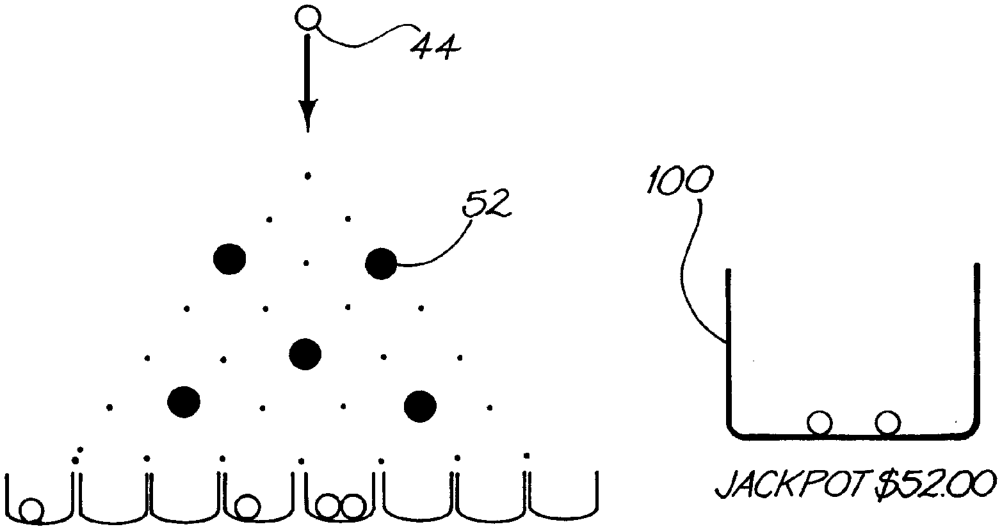
FIGS. 14 to 17 illustrate various steps in accordance with another embodiment of the game.
Figure 15:
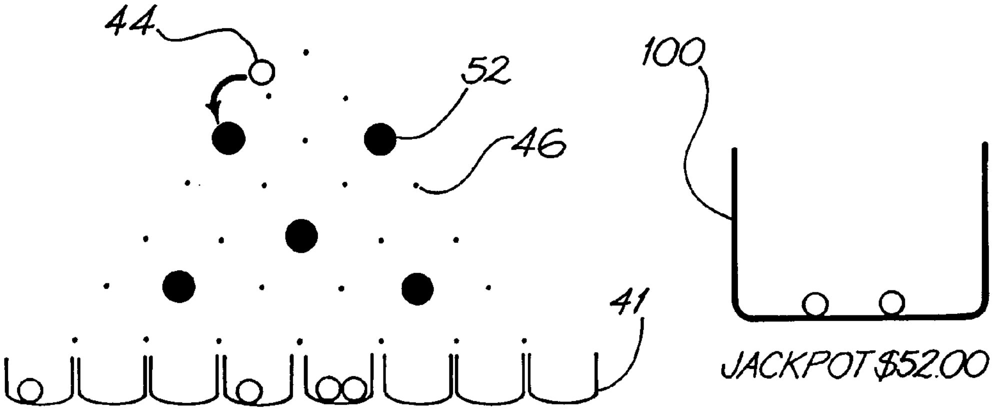
Figure 16:
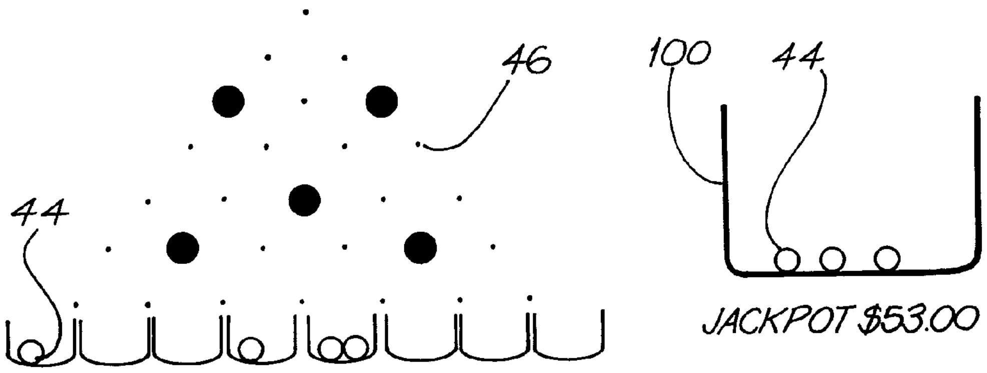

FIGS. 14 to 17 show a further embodiment of the invention. In FIG. 14, a ball 44 is shown as it is released to fall through the pins 46. The screen display includes a plurality of holes 52. As shown in FIG. 15, as the ball 44 falls through the pins 46, and comes in to register with one of the holes 52, it is drawn into the hole 52 and is discharged into a jackpot bucket 100.

The jackpot bucket 100 represents a progressive jackpot with a start-up amount of $50.00. Whenever a ball 44 is received in the bucket 100, the jackpot meter increments by $1.00.

Figure 17:
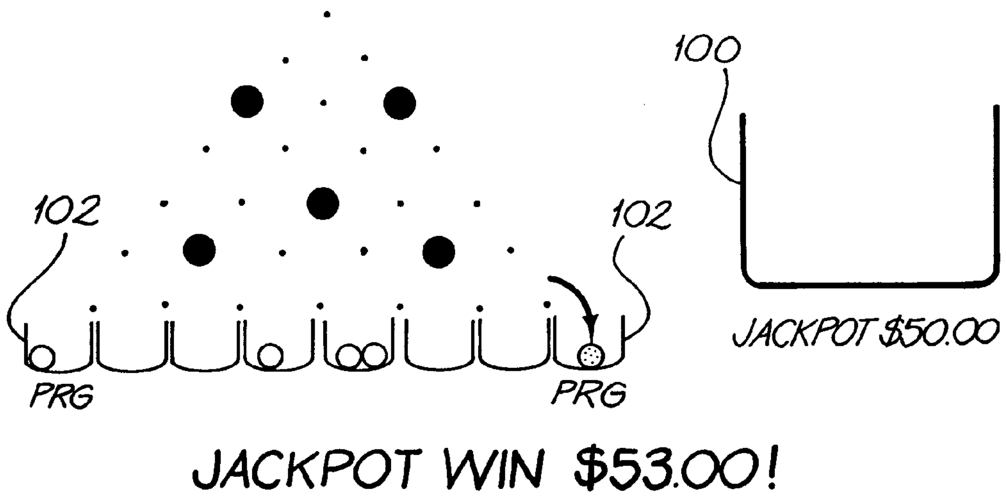

As illustrated in FIG. 17, if a subsequent ball 44 is received in a predetermined bucket 41, as illustrated by outer bucket 102 in FIG. 17, the jackpot is awarded to the player. The jackpot may, if desired, only be awarded if a ball of a particular configuration, such as a particular colour, is received in one of the buckets 102. For example, a grey ball received in one of the buckets 102 may trigger payment of the jackpot. When the jackpot is paid, the jackpot amount in respect of the jackpot bucket 100 is reset to the base amount, ie., $50.00.

In another embodiment, the jackpot may be paid as a mystery jackpot where a mystery trigger condition triggers payment of the jackpot or the jackpot could be paid automatically when it reaches a predetermined level as set by the gaming machine or a central controller to which the gaming machine is linked.

The plurality of game features described with reference to FIGS. 3-17 and those described below, can be mixed in a variety of other combinations and each of the features may be offered for purchase by the player in a particular game (eg, an additional card 7, may buy less holes or more cups).

The basic structure of the game can be varied by:

(i) changing the type of balls to be dropped, such as balls of different sizes, balls of different colours and/or balls carrying different numbers which are equal to prizes, (ii) changing the functions of balls to be dropped, (iii) changing the number of balls to be dropped, (iv) changing the position from where the balls are dropped, (v) changing the number of rows of pins, (vi) changing the pin pattern, (vii) awarding prizes/bonuses/features depending on how the containers and/or pins are hit, (viii) varying the number of balls such that the higher the bet, the more balls may be purchased, (ix) changing the position of prize buckets, (x) changing the number or position of holes amongst the pins, (xi) allowing access to different tools or controls which may affect the path of the balls, (xii) incorporating other types of games into the base game. For example, spinning reels (see below), keno, bingo, card games, second screen animations, chocolate wheels (see below) and so on. These could be bonus features awarded from the base game, base games that trigger a feature of the pin and ball game or may be played in conjunction with the base game (eg, reels spin and then balls drop for every game played).

Note that any of the types of game structures or features listed above, may change on a game by game basis or as a special feature when triggered by a particular event during the base game. In some cases, the player may even be able to select the structure that they want.

The betting strategy provided by the game can be any of the following:

(i) each credit buys one ball, therefore, a bet of 10 credits buys 10 balls, (ii) varying the number of balls such that the higher the bet the more balls drop, for example: Bet 1, 3, 6, 12 and 20 credits give 5, 6, 7, 8, and 9 balls respectively,
(iii) varying the number of pins such that the higher the bet more or less rows of pins appear,
(iv) varying the number of pins such that the higher the bet more or less pins appear,
(v) varying the number of containers such that the higher the bet more containers become available. For example, a bet of 1 credit buys the first 4 containers from left to right; a bet of 2 credits buys all eight,
(vi) varying the number of pin features such that the higher the bet more pin features can be won,
(vii) varying the size of the prizes such that all prizes are multiplied (preferably linearly) by a factor which is a function of bet size,
(viii) varying the number of active balls dropped, with the same number of balls being be dropped from game to game, independent of the number of balls purchased, and with unpurchased balls being distinguished by appearance,
(ix) varying the size or shape of the balls to change the chance of specific effects occurring,
(x) varying the location from which the balls are dropped, such that the further out from the centre that the balls drop, the greater chance of the balls landing in the outside buckets which will have larger prizes,
(xi) varying the number of holes that appear for the balls to disappear into,
(xii) varying the function of the balls under certain circumstances,
(xiii) varying the number of tools available to re-direct the path of the balls,
(xiv) varying the number of prize zones that are available,
(xv) varying the number of balls required in a bucket to give a prize (i.e. a higher bet requires fewer balls),
(xvi) varying the number of times a pin has to be hit or the number of pins that need to be hit in order to award a bonus feature (i.e. a higher bet requires fewer hits or fewer pins).

For the betting strategy where higher bets buy additional balls, a low bet may result in the balls that have not been bought still being shown to drop. In this way, the player can see prizes that they have missed due to their low stake, and can possibly still use the balls that weren't bought towards feature triggers.

The balls that have not been bought would need to be easily distinguished from the bought balls, for example, they could be smaller and/or transparent in appearance, or merely a different colour.

In general, prizes will be paid according to how many balls are in each container.

Containers may have the following features or characteristics:
(i) a free game, free balls or any other type of bonus can be won when certain containers are filled in a pre-determined way, for example: 10 free games are won when 2 or more balls end up in the last column,
(ii) containers may not always be open, they may have a top or cover which can prevent balls from entering the container under certain conditions,
(iii) some containers may have springs which will flick the balls to other containers,
(iv) some containers may become bonus baskets,
(v) a specified number of balls may need to drop into the same container in order to win a prize or jackpot, for example, 3 balls in container 1, pays 100 credits,
(vi) balls may remain in the containers across multiple games allowing them to accumulate as each game is played,
(vii) as a special feature, the prizes associated with particular containers may become much larger,
(viii) an animated object may sit above the container and catch balls before they drop into a container possibly moving them to other locations,
(ix) roaming containers could exist that move position from game to game or as the balls drop or as a special feature, the containers may also be moving while the balls drop.

Pins can also be provided with specific features or characteristics as follows:
(i) depending on either the number of times each pin is hit and/or whether or not certain patterns such as a row, diagonal or diamond shape made up of hit pins occurs, prizes or bonuses are paid such as:
free games
free balls
second screen features
wins multiplied by odds
progressives,
(ii) the pins can occur in different patterns from game to game, for example: in one game they make up a triangular shape; in another, a diamond shape,
(iii) pins may swallow or capture balls when hit,
(iv) pins may release balls when hit,
(v) each time a pin is hit it may become lit, change colour and/or record the number of hits to award bonuses,
(vi) pins may have different colours so that when a certain combination of colours are all lit bonuses are paid,
(vii) pins may be tilted so that the ball bounce will be biased to one side,
(viii) pins may have holes in them for the ball to pass or may be able to be knocked over for the ball to continue on its path,
(ix) pins, in any pattern, may randomly flash during the ball drop sequence awarding bonuses,
(x) pins may be greyed out or move in and out to make it easier/harder for balls to roll,
(xi) pins may be joined by a rod to block balls from rolling down certain paths,
(xii) pins may have numbers on them which represent the amount of credits, free games, etc. won when they are either hit or lit,
(xiii) when all pins are hit/lit a bonus is paid,
(xiv) some pins may have the ability to flick the ball in any direction,
(xv) some pins may be sticky such that if a ball hits them, it will stick and stay on the pin, this could create a block where balls can no longer pass through that position or another ball could be required to hit the stuck ball in order to dislodge it,
(xvi) for the duration of a free game feature, all holes that are normally present to swallow balls during the base game could be replaced by pins hence guaranteeing a prize for each ball dropped in a free game (or at least giving a higher probability of prizes),
(xvii) there maybe feature pins, for example, free game pins such that if a certain number of free game pins are hit a free game feature will be awarded, alternatively, "shortcut" pins such that when a ball hits the shortcut pin it will skip straight to another position on the screen,
(xviii) pins may have deflectors such that when hit, the will always deflect a ball in one specified direction,
(xix) as a special feature, the centre pin or pins may become larger, blocking off access through the centre and hence increasing the chance of balls falling towards the outer containers,
(xx) all pins may become the same colour as a special feature, (xxi) "elastic bands" may be placed around 2 or more pins such that if a ball drops against the band, it will be bounced off rather than merely deflected. Balls can also have different features and characteristics as follows:

(i) the balls may be the same colour, different colours during the same game or change colours from game to game, they may also have numbers on them, both the colouring and numbers can be utilised to award prizes, (ii) special balls when hitting pins may split up into a number of balls, (iii) special balls may have the ability to jump from column to column and award prizes, (iv) special balls will enable bonuses to be found, (v) there may be a larger ball which can knock pins over or split into smaller balls, (vi) balls may fall down the pin holes, (vii) a slot reel, chocolate wheel or other mechanism may be activated by a ball or other means to provide a multiplier, bonus or trigger, (viii) different sized balls could be provided such that bigger balls are less likely to fall down holes, (ix) different shaped balls could be provided such that spherical balls can only fall down round holes, cubic "balls" will only fall down square holes, elliptical "balls" can only fall down oval holes etc, (x) large balls or "superballs" may block holes or knock out pins, (xi) the speed of the ball drop may differ depending upon the size of the ball, (xii) as balls drop, the path that they follow may be plotted, for example, the pins that they hit may change colour, if another ball follows that same path or a lit path a bonus (prize or feature) may be given, alternatively, if all pins become lit, a bonus (prize or feature) may be give, the lit pins may even be carried across from one game to the next, (xiii) as balls drop, blockages formed as a blocking element such as a pin or other object may be placed along the path that they follow such that no other ball may drop through the blockages, (xiv) the balls could be in the shape of coins or other objects, (xv) certain balls may alter the paths for other balls, for example, if a certain ball drops in one direction when it hits a particular pin, then all balls to hit the same pin from then on will also drop in that same direction, (xvi) when balls drop into holes something may happen to them, for example, they may be channelled into containers or come out other holes or re-appear in other sections of the screen, (xvii) balls may change colour as they drop, or may change the colour of pins that they hit to their own colour, similarly, certain balls that drop into a container may change the colour of all other balls in that same container, (xviii) some wins could be paid in balls rather than credits, that is, certain events may cause extra balls to be dropped as part of the same game, these may or may not be at extra cost to the player, (xix) some balls may "defy gravity" by 'dropping' across the screen horizontally or upwards or similar, hence, prize containers may appear on all sides of the pin layout rather than just at the bottom, (xx) "Fireballs" may exist that burn the pins as they hit them, (xxi) balls may be numbered or have letters on them, if they land in a certain order or spelling a specific word, a bonus (prize or feature) may be awarded, (xxii) holes may disappear or close up as soon as a ball drops into them.

Skill elements can also be provided in a game, for example:

(i) games may include an element of skill provided by including player controls which enable the player to drop or project the balls at different angles, (ii) the game may have a flipper to flick the balls.

Tools or Controls can also be provided in some games such as:

(i) flippers could be provided at certain locations such that if a ball hits the flipper it will (automatically or by control of the player) be flicked back to drop through some or all of the pins again, hence providing a second chance at prizes or feature triggers, (ii) ladders, magnets or some other objects could cause the balls to move upwards or in other directions instead of just dropping downwards. In certain games, a game feature of a chocolate wheel can be provided which could have features such as:

(i) a chocolate wheel could replace a prize container where as the ball drops through the chocolate wheel, it will spin and pay the prize that is spun up, (ii) an independent chocolate wheel could be displayed where certain triggers or prizes can cause the chocolate wheel to spin to reveal a bonus by way of a prize, win multiplier, number of free games, extra balls to drop, change in the game structure or similar, (iii) an independent chocolate whee could be displayed so that whenever balls fall into certain containers or similar, the chocolate wheel will spin to reveal the prize that will be awarded.

Games can also include a game feature of spinning reels which may have features such as:

(i) a spinning reel game could be played above the pins such that when a winning combination occurs on the reels, coins could come out from below the reels and drop into the pins so that the base game determines the prize, (ii) a spinning reel game element could be used to determine the base game structure, for example, the prize values, position of holes, number of pins, pin layout or similar, (iii) containers could have multipliers on them, then, when a win on a spinning reel game occurs, a ball could be dropped through the pins to determine how much the win will be multiplied by.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A gaming system comprising a plurality of linked gaming machines, each gaming machine having a display and a game controller arranged to control images displayed on the display, the gaming system further comprising:

a jackpot prize having a value that is winnable by a player of one of said gaming machines, wherein awarding of said jackpot prize is triggered through a trigger event occurring at one of said plurality of gaming machines during play of said one gaming machine; and a progressive jackpot controller, linked to each of the gaming machines, for controlling the awarding of the jackpot prize to one of said plurality of gaming machines, and said progressive jackpot controller configured to increase the value of the jackpot prize when one of a plurality of predetermined prize altering events randomly occurs at one of said plurality of gaming machines during play of said gaming machine;

wherein each of said plurality of prize altering events is associated with a respective amount by which to increase the value of the jackpot prize and, in response to one of the prize altering events occurring at a gaming machine, the value of the jackpot prize is increased by the respective amount associated with the prize altering event; and wherein, in response to the triggering event occurring at a gaming machine, the progressive jackpot controller awards the value of the jackpot prize amount to the player of the gaming machine on which the trigger event occurs.

2. The gaming system as claimed in claim 1, wherein each of said linked gaming machines plays a game selected from the set comprising spinning reel games, card games and ball games.

3. The gaming system as claimed in claim 1, wherein the value of the jackpot prize is determined by the progressive jackpot controller in response to a predetermined prize altering event occurring from time to time at a gaming machine.

4. The gaming system as claimed in claim 1, wherein the occurrence of a triggering event is independent of the occurrence of any one of the plurality of predetermined prize altering events.

5. The gaming system as claimed in claim 1, wherein the triggering event occurs at a gaming machine upon an accumulation of a predefined number of predetermined prize altering events occurring at said gaming machine.

6. The gaming system as claimed in claim 1, wherein a game is played on said display; and wherein the predetermined prize altering event is independent of the game played on said display.

7. The gaming system as claimed in claim 1, wherein a game is played on said display; and wherein the occurrence of one of the plurality of predetermined prize altering events is related to the placing of a certain bet in respect of the play of the game.

8. The gaming system as claimed in claim 1, wherein the triggering event is a random event.

* * * * *